Patented Sept. 1, 1936

2,052,652

UNITED STATES PATENT OFFICE 2,052,652

PREPARATION OF ACETONYLACETONE

Granville A. Perkins and Walter J. Toussaint, Charleston, W. Va., assignors, by mesne assignments, to Union Carbide and Carbon Corporation, a corporation of New York No Drawing. Application March 28, 1935, Serial No. 13,483

5 Claims. (Cl. 260—134)

The invention relates to a process for preparing acetonylacetone. This compound is a diketone, commonly represented by the formula $CH_3.CO.CH_2.CH_2.CO.CH_3$. It is a liquid of pleasant odor, boiling at about 194° C., and having a specific gravity of 0.972 at 20° C. Increasing commercial importance of this compound, for various purposes in the chemical art, is indicated.

In accordance with our invention, we have found that acetonylacetone may be prepared, in efficient yields, by rapid hydration of 2,5-dimethylfurane, under properly controlled conditions. The process consists essentially in heating this latter chemical at a temperature of about 90° C. to 110° C., under a pressure not substantially greater than atmospheric, and in the presence of a dilute aqueous solution of sulfuric acid. Under these conditions a conversion to acetonylacetone of 80% or higher of the theoretical has been obtained. As a starting product for the purpose of the present invention, the 2,5-dimethylfurane may be prepared in any known manner, one quite suitable process being disclosed in our copending application Serial No. 13,482, filed concurrently herewith.

The following examples are illustrative of this process:

Example I

A crude product containing about 75% of 2,5-dimethylfurane together with some water, methylethyl ketone, and esters was used as a starting product. This material, in an amount of 22,610 grams, was placed in a copper still with 330 grams of sulfuric acid in an aqueous solution of about 4%. The methylethyl ketone present in the mixture was very slowly distilled off through a fractionating column, with the temperature at the top of the column kept below 73° C. When no further distillate could be taken off below this temperature, a total reflux was maintained and continued until the kettle temperature rose to 99.5° C., which required a total time of 44 hours. Sodium carbonate was then added in an amount sufficient to neutralize the sulfuric acid, and the crude reaction product was distilled under reduced pressure. On refractionation of the distillate, a liquid was obtained, showing a specific gravity of 0.972 at 20° C., and other properties identifying it as acetonylacetone. A yield of 15,726 grams of pure material was obtained, which was estimated to be about 80% of that theoretically obtainable from the dimethylfurane in the crude starting product. Another 5% to 10% of the product was probably lost during prior distillation and in unconverted dimethylfurane.

Example II

In a manner substantially similar to the above, another reaction was conducted with purified 2,5-dimethylfurane, rather than the crude product. Using 269 grams of pure dimethylfurane, in the presence of about a 3% aqueous solution including a total of 3.18 grams of sulfuric acid, a practically complete hydration was effected in about 44 hours. The temperature of this reaction varied between 93° C. and 96° C. Fractional distillation, after neutralizing the acid, yielded 221 grams of pure acetonylacetone.

In both examples given the hydration was conducted under substantially atmospheric pressure. Increased pressure may be used, but does not appear desirable, in view of the efficiency of the reaction under normal pressures. An aqueous acid solution of about 3% is preferable, but as low as a 2% concentration may also be satisfactory, especially in the presence of a mutual solvent for the water and dimethylfurane, or means for causing intimate mixing thereof. Acetonylacetone is in itself such a solvent, and undoubtedly assists in the latter stages of the hydration. The reaction proceeds very well at about the boiling temperature of the dimethylfurane, or within a range of about 90° C. to 110° C.

The ability of sulfuric acid to promote this hydrolysis appears to be unique in this particular acid, since under test conditions similar to those above described, other acids, such as phosphoric, acetic and hydrochloric acid, are decidedly ineffective, and cannot compare, in their efficiency as a catalyst, with sulfuric acid.

We claim:

1. A process for preparing acetonylacetone which comprises heating to boiling 2,5-dimethylfurane under substantially atmospheric pressure in the presence of a dilute aqueous solution of sulfuric acid of a concentration not greater than about 4%.

2. A process for preparing acetonylacetone which comprises heating 2,5-dimethylfurane in the presence of an aqueous solution of sulfuric acid having a concentration of about 2% to about 4%.

3. A process for preparing acetonylacetone which comprises heating 2,5-dimethylfurane in the presence of an aqueous solution of sulfuric acid having a concentration of about 3%.

4. A process for preparing acetonylacetone which comprises boiling 2,5-dimethylfurane in the presence of a 2% to 4% aqueous solution of sulfuric acid, maintaining the boiling temperature until hydration of substantially all of the 2,5-dimethylfurane has been effected, and isolating acetonylacetone from the reaction product.

5. A process for preparing acetonylacetone which comprises heating 2,5-dimethylfurane at a temperature of about 90° C. to 110° C. in the presence of about a 3% aqueous solution of sulfuric acid, maintaining this temperature until hydration of substantially all of the 2,5-dimethylfurane has been effected, and isolating pure acetonylacetone from the reaction product.

GRANVILLE A. PERKINS.
WALTER J. TOUSSAINT.